United States Patent
Matsumoto et al.

(10) Patent No.: US 6,690,136 B2
(45) Date of Patent: Feb. 10, 2004

(54) NUMERICAL CONTROLLING UNIT

(75) Inventors: Ichiro Matsumoto, Numazu (JP); Jun Fujita, Mishima (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 6 days.

(21) Appl. No.: 10/125,610

(22) Filed: Apr. 19, 2002

(65) Prior Publication Data

US 2002/0180394 A1 Dec. 5, 2002

(30) Foreign Application Priority Data

Apr. 25, 2001 (JP) ..................................... 2001-127560

(51) Int. Cl.$^7$ ................................................ G05B 5/01
(52) U.S. Cl. ...................... 318/623; 318/434; 318/466; 318/468; 318/470; 318/611
(58) Field of Search ................................ 318/434, 466, 318/468, 469, 470, 569, 611, 600, 623; 388/530

(56) References Cited

U.S. PATENT DOCUMENTS

| | | | |
|---|---|---|---|
| 5,117,992 A | * | 6/1992 | Simkus et al. ............... 212/275 |
| 5,485,065 A | * | 1/1996 | Kaneko et al. .............. 318/270 |
| 5,800,331 A | * | 9/1998 | Song ............................. 494/7 |
| 5,959,864 A | * | 9/1999 | Mori et al. .................. 700/159 |
| 6,054,822 A | * | 4/2000 | Harada ......................... 318/434 |

* cited by examiner

Primary Examiner—Karen Masih
(74) Attorney, Agent, or Firm—Pillsbury Winthrop LLP

(57) ABSTRACT

The invention relates to a numerical controlling unit that includes: a instructing part that provides a command acceleration for a servomotor, a parameter storing part that stores a threshold parameter about a load of the servomotor, and a load measuring part that measures the load of the servomotor. The load measured by the load measuring part and the threshold parameter are compared by a load comparing part, and an acceleration adjusting part changes the command acceleration for the servomotor based on a result compared by the load comparing part. A controlling part controls the servomotor based on the changed command acceleration. According to the invention, the command acceleration for the servomotor is suitably changed based on the result of comparing the load measured by the load measuring part and the threshold parameter. Thus, it can be prevented that the servomotor is subjected to an overload while using the maximum performance in feeding a work piece.

10 Claims, 2 Drawing Sheets

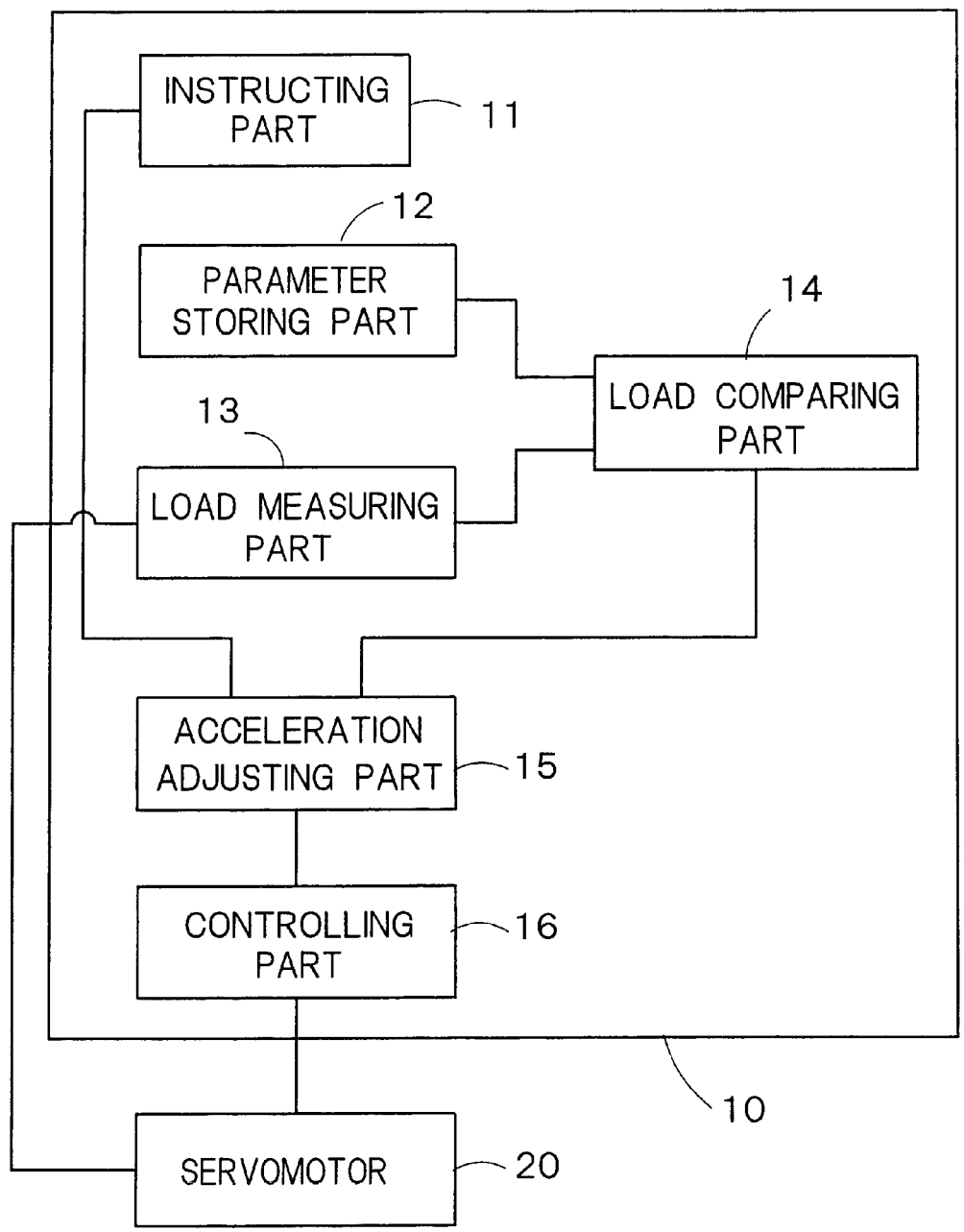
F I G. 1

NUMERICAL CONTROLLING UNIT

BACKGROUND OF THE INVENTION

1. Field of the Invention

This invention relates to a numerical controlling unit that controls acceleration of a servomotor in such a manner that the servomotor is not subjected to an overload.

2. Description of the Related Art

There are known various types of numerical controlling units that control acceleration of a servomotor. In controlling the acceleration of a servomotor, an overload of the servomotor may be a problem.

An overload of a servomotor is explained concerning a machine tool by way of an example. A main factor of an overload of the servomotor in the machine tool is thought to be a load by friction in feeding a work piece or tool or by a cutting force and a load by acceleration-deceleration torque for feeding a work piece or tool.

In prior art, in order to prevent an overload of the servomotor in the machine tool, the load by friction in feeding a work piece or tool or by a cutting force is monitored. Then, the speed of the servomotor is limited in such a manner that the load doesn't cause any overload of the servomotor.

In addition, in order for the load by acceleration-deceleration torque for feeding a work piece not to cause an overload of the servomotor, an upper limit for acceleration is set so as not to cause any overload even if accelerating and/or decelerating is frequent.

In the above prior art, the upper limit for acceleration for feeding a work piece is set at a value on the assumption that accelerating and/or decelerating is frequent. This means that performance in feeding the work piece can not be used sufficiently.

SUMMARY OF THE INVENTION

Therefore, the object of this invention is to provide a numerical controlling unit that can control acceleration of a servomotor in such a manner that the servomotor is not subjected to an overload, and that can use performance thereof in feeding the work piece sufficiently.

To achieve the above object, this invention is characterized by following features. That is, this invention is a numerical controlling unit comprising: a instructing part that provides a command acceleration for a servomotor; a parameter storing part that stores a threshold parameter about a load of the servomotor; a load measuring part that measures the load of the servomotor; a load comparing part that compares the load measured by the load measuring part with the threshold parameter; an acceleration adjusting part that changes the command acceleration for the servomotor based on a result compared by the load comparing part; and a controlling part that controls the servomotor based on the changed command acceleration.

According to the feature, the command acceleration for the servomotor is suitably changed based on the result of comparison between the load measured by the load measuring part and the threshold parameter. Thus, it can be prevented that the servomotor is subjected to an overload while using the maximum performance in feeding a work piece.

Preferably, when the load measured by the load measuring part is over the threshold parameter, the acceleration adjusting part is adapted to decrease the command acceleration for the servomotor by a value corresponding to a differential between the load measured by the load measuring part and the threshold parameter.

According to the feature, the load of the servomotor is suitably limited to the threshold parameter as its maximum. Thus, it can be prevented more surely that the servomotor is subjected to an overload.

In the case, it is preferable that: when the acceleration has been decreased once and then the load measured by the load measuring part becomes lower than the threshold parameter by a predetermined value or more, the acceleration adjusting part is adapted to increase the command acceleration for the servomotor by a value corresponding to a differential between the load measured by the load measuring part and the threshold parameter, within a range of the previous decrease of the acceleration. Through such a suitable control by the acceleration adjusting part, the performance in feeding a work piece can be used to the maximum.

For example, the load measuring part may be adapted to measure the load of the servomotor from a command torque for the servomotor.

In addition, this invention is a numerical controlling unit comprising: a instructing part that provides a command acceleration for a servomotor; a parameter storing part that stores a threshold parameter about a load of the servomotor; a load estimating part that estimates the load of the servomotor; a load comparing part that compares the load estimated by the load estimating part with the threshold parameter; an acceleration adjusting part that changes the command acceleration for the servomotor based on a result compared by the load comparing part; and a controlling part that controls the servomotor based on the changed command acceleration.

According to the feature, the command acceleration for the servomotor is suitably changed based on the result of comparison between the load estimated by the load estimating part and the threshold parameter. Thus, it can be prevented that the servomotor is subjected to an overload while using the maximum performance in feeding a work piece.

Preferably, when the load estimated by the load estimating part is over the threshold parameter, the acceleration adjusting part is adapted to decrease the command acceleration for the servomotor by a value corresponding to a differential between the load estimated by the load estimating part and the threshold parameter.

According to the feature, the load of the servomotor is suitably limited to the threshold parameter as its maximum. Thus, it can be prevented more surely that the servomotor is subjected to an overload.

In the case, it is preferable that: when the acceleration has been decreased once and then the load estimated by the load estimating part becomes lower than the threshold parameter by a predetermined value or more, the acceleration adjusting part is adapted to increase the command acceleration for the servomotor by a value corresponding to a differential between the load estimated by the load estimating part and the threshold parameter, within a range of the previous decrease of the acceleration. Through such a suitable control by the acceleration adjusting part, the performance in feeding a work piece can be used to the maximum.

For example, the load estimating part may be adapted to read a subsequent plurality of blocks of a control program for the servomotor, and then estimate the load of the servomotor from an effective value of an acceleration-deceleration torque by the control program.

BRIEF DESCRIPTION OF THE DRAWINGS

FIG. 1 is a schematically block diagram of a first embodiment of a numerical controlling unit according to the invention.

BEST MODE FOR CARRYING OUT THE INVENTION

Figure 2:
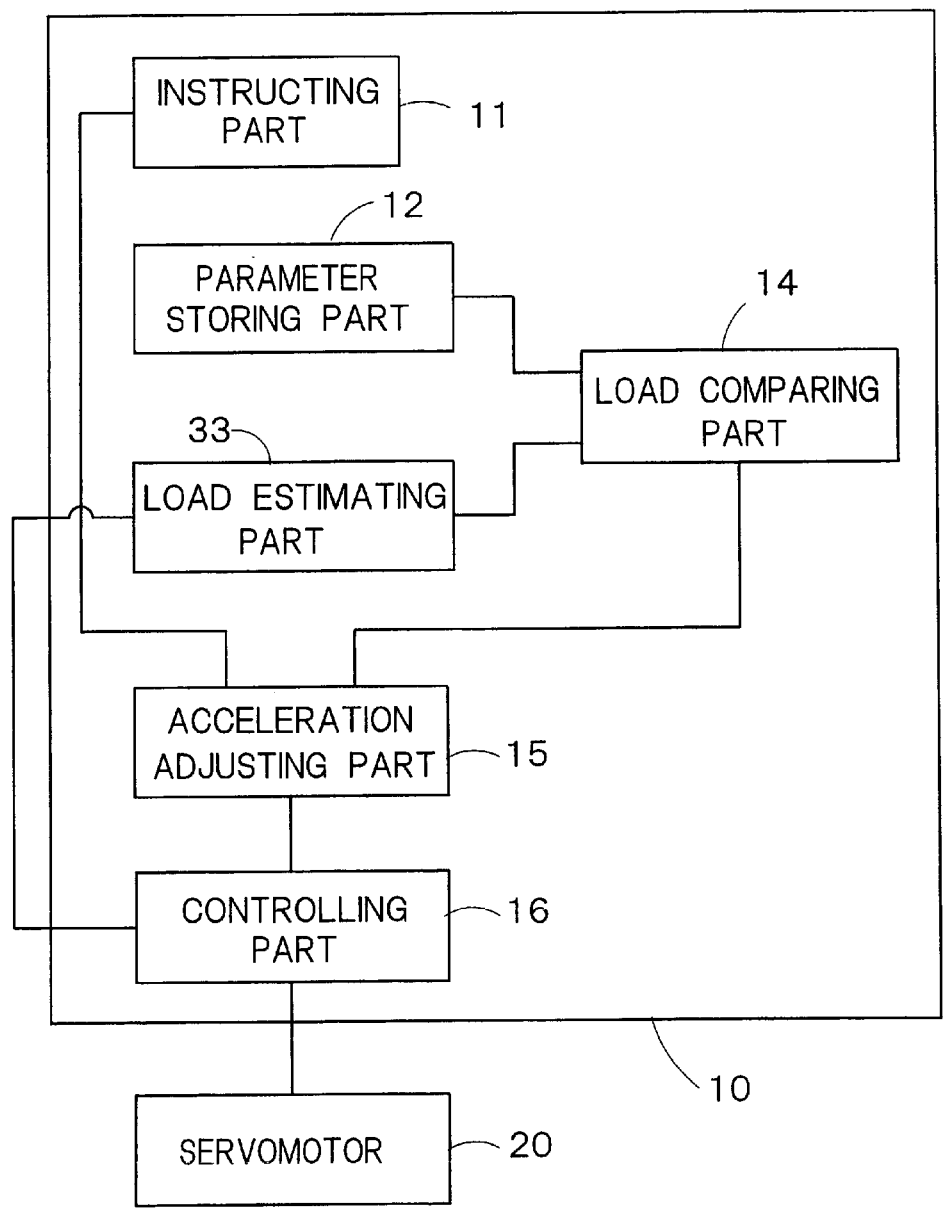
FIG. 2 is a schematically block diagram of a second embodiment of a numerical controlling unit according to the invention.

Embodiments of the invention are explained in more detail with reference to the drawings.

FIG. 1 is a schematically block diagram of a first embodiment of a numerical controlling unit according to the invention. As shown in FIG. 1, the numerical controlling unit 10 of the first embodiment is connected to a servomotor 20 that is an object to be controlled.

As shown in FIG. 1, the numerical controlling unit 10 includes: a instructing part 11 that provides a command acceleration for the servomotor 20, a parameter storing part 12 that stores a threshold parameter about a load of the servomotor 20, and a load measuring part 13 that measures the load of the servomotor 20.

The parameter storing part 12 of the embodiment stores a continuous rated torque Tr of the servomotor 20 as the threshold parameter about a load of the servomotor 20.

The load measuring part 13 of the embodiment is adapted to measure the load of the servomotor 20 from a command torque for the servomotor 20. The command torque for the servomotor 20 correlates with a temperature of the servomotor 20. Thus, the temperature of the servomotor 20 can be obtained by measuring the command torque. A critical (limit) load of the servomotor 20 corresponds to a critical (limit) temperature of the servomotor 20 at which a burned damage is caused in the servomotor 20. Thus, a load-state of the servomotor 20 can be known from the command torque.

Alternatively, by using thermocouples or the like, a temperature of the servomotor 20 may be detected directly, and the temperature may be used as a load-state of the servomotor 20.

In addition, the load measuring part 13 of the embodiment is adapted to estimate or add up the load-state of the servomotor 20 as a load-effective torque Ta.

The numerical controlling unit 10 has a load comparing part 14 that compares the continuous rated torque Tr of the servomotor 20 (threshold parameter) and the load-effective torque Ta of the servomotor 20 at the present time that has been measured by the load measuring part 13 as described above.

The numerical controlling unit 10 has: an acceleration adjusting part 15 that changes the command acceleration for the servomotor 20 based on a comparison result by the load comparing part 14, and a controlling part 16 that controls the servomotor 20 based on the changed command acceleration.

As a comparison result by the load comparing part 14, if a load-effective torque Ta at the present time is lower than the continuous rated torque Tr, the acceleration adjusting part 15 doesn't change the command acceleration for the servomotor 20. In this case, the controlling part 16 is adapted to control the servomotor 20 based on the command acceleration for the servomotor 20 provided from the instructing part 11 as it is.

As another comparison result by the load comparing part 14, if a load-effective torque Ta at the present time is over (higher than) the continuous rated torque Tr, the acceleration adjusting part 15 is adapted to decrease the command acceleration for the servomotor 20 by a value corresponding to a differential between the load-effective torque Ta at the present time and the continuous rated torque Tr, in particular by a value in proportion to the differential. When the proportional coefficient is represented by K, an original command acceleration is represented by A(Programmed), and the changed command acceleration is represented by A(Amended), the following expression is satisfied.

$$A(\text{Amended}) = A(\text{Programmed}) - K\,(Ta - Tr) \quad (1)$$

Herein, the relationship A(Amended)≦A(Programmed) is satisfied.

Next, an operation of the embodiment is explained.

Basically, the servomotor 20 is controlled by the controlling part 16 in accordance with the command acceleration from the instructing part 11. If the command acceleration rises up, a load-effective torque of the servomotor 20 also rises up correspondingly.

The relationship between the command acceleration for the servomotor 20 and the load-effective torque of the servomotor 20 varies dependently on the characteristic of the servomotor 20. However, regarding increase or decrease, the command acceleration for the servomotor 20 and the load-effective torque of the servomotor 20 substantially correspond to each other.

While the acceleration of the servomotor 20 is controlled, the load measuring part 13 measures the load of the servomotor 20 from the command torque for the servomotor 20. The measurement is repeated at each predetermined sampling-time.

For example, if a load-effective torque Tl at a time t1, which is estimated based on the command torque of the servomotor 20, is over (higher than) the continuous rated torque Tr, the command acceleration A(Programmed) at the time t1 is changed (amended) to the command acceleration A(Amended-1) in accordance with the following expression.

$$A(\text{Amended-1}) = A(\text{Programmed}) - K\,(Tl - Tr)$$

Then, the controlling part 16 controls the servomotor 20 in accordance with the command acceleration A(Amended−1).

As described above, according to the embodiment, a command acceleration for the servomotor 20 is suitably changed based on a result of comparison between a load-effective torque Ta measured by the load measuring part 13 and the continuous rated torque Tr. Thus, it can be prevented that the servomotor 20 is subjected to an overload, while the performance of the servomotor 20 in feeding a work piece can be used to the maximum.

In addition, the acceleration adjusting part 15 is adapted to increase or decrease a command acceleration for the servomotor 20 by a value in proportion to a differential between a load-effective torque Ta measured by the load measuring part 13 and the continuous rated torque Tr. Thus, the load-effective torque of the servomotor 20 is suitably limited to the continuous rated torque Tr as its maximum. Thus, it can be prevented more surely that the servomotor 20 is subjected to an overload.

Next, a second embodiment of the invention is explained with reference to FIG. 2. As shown in FIG. 2, the numerical controlling unit 10 of the second embodiment includes a load estimating part 33, instead of the load measuring part.

The load estimating part 33 of the embodiment is adapted to read a subsequent plurality of blocks of a control program for the servomotor 20, and then estimate an effective value of an accelerating or decelerating torque by the control program as a load-effective torque.

The other components or structures of the second embodiment are substantially the same as the first embodiment shown in FIG. 1. Thus, the other components or structures of the second embodiment are represented by the same reference numerals as the first embodiment, and the detail explanation thereof is omitted.

If respective effective torque Tl to Tn at respective times t1 to tn are obtained, the effective value of the accelerating or decelerating torque can be obtained via the following expression.

$$T_a = \sqrt{\frac{T_1^2 t_1 + T_2^2 t_2 + T_3^2 t_3 + \cdots + T_n^2 t_n}{t_1 + t_2 + t_3 + \cdots + t_n}}$$

According to the second embodiment, since the load measuring part 13 in the first embodiment is unnecessary, a more robust control can be achieved against outer disturbances or the like. In addition, if the effective value of the accelerating or decelerating torque is calculated in advance, the changed command acceleration can be set in advance.

In addition, a numerical controlling unit can include both the load measuring part and the load estimating part at the same time. In such a case, only one of the load measuring part and the load estimating part may be selectively used. Alternatively, after acceleration is changed (amended) based on a value measured by the load measuring part, the changed acceleration may be further changed based on a value estimated by the load estimating part.

Furthermore, the above embodiments may be developed to achieve a control that always uses substantially the maximum acceleration wherein the load-effective torque is close to the threshold parameter.

In detail, for example, in the first embodiment, when the acceleration has been decreased once and then the load (load-effective torque Ta) measured by the load measuring part 13 becomes lower than the threshold parameter (continuous rated torque Tr) by a predetermined value or more, the acceleration adjusting part 15 is preferably adapted to increase the command acceleration for the servomotor 20 by a value corresponding to a differential between the load measured by the load measuring part 13 and the threshold parameter, within a range of the previous decrease of the acceleration.

Alternatively, in the second embodiment, when the acceleration has been decreased once and then the load (load-effective torque Ta (effective value of the accelerating or decelerating torque)) estimated by the load estimating part 33 becomes lower than the threshold parameter (continuous rated torque Tr) by a predetermined value or more, the acceleration adjusting part 15 is preferably adapted to increase the command acceleration for the servomotor 20 by a value corresponding to a differential between the load estimated by the load estimating part 33 and the threshold parameter, within a range of the previous decrease of the acceleration.

What is claimed is:

1. A numerical controlling unit comprising:
   a instructing part that provides a command acceleration for a servomotor,
   a parameter storing part that stores a threshold parameter about a load of the servomotor,
   a load measuring part that measures the load of the servomotor,
   a load comparing part that compares the load measured by the load measuring part with the threshold parameter,
   an acceleration adjusting part that changes the command acceleration for the servomotor based on a result compared by the load comparing part, and
   a controlling part that controls the servomotor based on the changed command acceleration wherein:
   when the load measured by the load measuring part is over the threshold parameter, the acceleration adjusting part is adapted to decrease the command acceleration for the servomotor by a value corresponding to a differential between the load measuring part and the threshold parameter.

2. A numerical controlling unit according to the claim 1, wherein:
   when the acceleration has been decreased once and then the load measured by the load measuring part becomes lower than the threshold parameter by a predetermined value or more, the acceleration adjusting part is adapted to increase the command acceleration for the servomotor by a value corresponding to a differential between the load measured by the load measuring part and the threshold parameter, within a range of the previous decrease of the acceleration.

3. A numerical controlling unit according to the claim 1, wherein:
   the load measuring part is adapted to measure the load of the servomotor from a command torque for the servomotor.

4. A numerical controlling unit according to the claim 1, wherein:
   the load measuring part is adapted to measure the load of the servomotor from a command torque for the servomotor.

5. A numerical controlling unit according to the claim 2, wherein:
   the load measuring part is adapted to measure the load of the servomotor from a command torque for the servomotor.

6. A numerical controlling unit comprising:
   a instructing part that provides a command acceleration for a servomotor
   a parameter storing part that stores a threshold parameter about a load of the servomotor,
   a load estimating part that estimates the load of the servomotor,
   a load comparing part that compares the load estimated by the load estimating part with the threshold parameter,
   an acceleration adjusting part that changes the command acceleration for the servomotor based on a result compared by the load comparing part, and
   a controlling part that controls the servomotor based on the changed command acceleration wherein:
   when the load estimated by the load estimating part is over the threshold parameter, the acceleration adjusting part is adapted to decrease the command acceleration for the servomotor by a value corresponding to a differential between the load estimated by the load estimating part and the threshold parameter.

7. A numerical controlling unit according to the claim 6, wherein:
   when the acceleration has been decreased once and then the load estimated by the load estimating part becomes lower than the threshold parameter by a predetermined value or more, the acceleration adjusting part is adapted to increase the command acceleration for the servomotor by a value corresponding to a differential between the load estimated by the load estimating part and the threshold parameter, within a range of the previous decrease of the acceleration.

8. A numerical controlling unit according to the claim 6, wherein:

the load estimating part is adapted to read a control program for the servomotor, and then estimate the load of the servomotor from an effective value of an acceleration-deceleration torque by the control program.

9. A numerical controlling unit according to the claim 6, wherein:

the load estimating part is adapted to read a control program for the servomotor, and then estimate the load of the servomotor from an effective value of an acceleration-deceleration torque by the control program.

10. A numerical controlling unit according to the claim 7, wherein:

the load estimating part is adapted to read a control program for the servomotor, and then estimate the load of the servomotor from an effective value of an acceleration-deceleration torque by the control program.

* * * * *